United States Patent [19]

Marrs et al.

[11] 3,931,078

[45] Jan. 6, 1976

[54] SEALANT AND COATING COMPOSITIONS FROM POLY(OXYALKYLENE)-POLYESTER-POLY(MONOSULFIDE)-POLYTHIOLS, COAL TAR, AND FILLERS

[75] Inventors: Oren L. Marrs; Richard C. Doss, both of Bartlesville, Okla.

[73] Assignee: Phillips Petroleum Company, Bartlesville, Okla.

[22] Filed: Feb. 20, 1974

[21] Appl. No.: 444,143

[52] U.S. Cl. ................................................. 260/28
[51] Int. Cl.² ........................................... C08L 95/00
[58] Field of Search ..................... 260/75 S, 76, 28

[56] References Cited
UNITED STATES PATENTS

| | | | |
|---|---|---|---|
| 2,910,922 | 11/1959 | Horning | 260/28 |
| 3,316,194 | 4/1967 | Payne | 260/28 |
| 3,491,046 | 1/1970 | Pachuta | 260/28 |
| 3,503,930 | 3/1970 | Morris | 260/28 |
| 3,540,961 | 11/1970 | Shipp | 260/28 |
| 3,717,617 | 2/1973 | Marrs | 260/75 S |
| 3,749,688 | 7/1973 | Mihelic | 260/28 |
| 3,798,192 | 3/1974 | Kenton | 260/75 S |
| 3,810,857 | 5/1974 | Garrigues | 260/28 |

*Primary Examiner*—Paul R. Michl

[57] ABSTRACT

Sealant and coating formulations are prepared by curing a mixture comprising (a) a polymercaptan-terminated polymer such as a poly(oxyalkylene)-polyester-poly(monosulfide)-polythiol having an average of more than two mercapto groups per molecule, (b) a bituminous material such as coal tar, (c) a filler such as clay, optionally together with a minor amount of a pigment or a wetting agent.

15 Claims, No Drawings

SEALANT AND COATING COMPOSITIONS FROM POLY(OXYALKYLENE)-POLYESTER-POLY(MONOSULFIDE)-POLYTHIOLS, COAL TAR, AND FILLERS

This invention relates to sealant and coating formulations containing polymercaptan-terminated polymers. In accordance with another aspect, this invention relates to the use of bituminous materials and fillers in poly(oxyalkylene)-polyester-poly(monosulfide)-polythiols to provide sealants and coatings having improved physical properties. In accordance with another aspect, this invention relates to the preparation of sealant and coating compositions by curing a mixture comprising a poly(oxyalkylene)-polyester-poly(monosulfide)-polythiol having an average of more than two mercapto groups per molecule, a coal tar, and a filler such as hard kaolin clay. The incorporation of a bituminous material such as coal tar and a filler into a poly(oxyalkylene)-polyester-poly(monosulfide)-polythiol as defined, together with a curing agent, produces cured compositions useful as sealants and coatings having highly elastomeric qualities.

Accordingly, it is an object of this invention to provide sealants and coatings based on polymercaptan-terminated polymers.

It is another object of this invention to provide a process for the production of improved sealant formulations.

Another object of this invention is to provide polymercaptan-terminated polymers which are curable to sealants and coatings having improved properties.

Another object of this invention is to provide cured sealant and coating compositions having improved tensile break values, modulus values and elongation values.

Other objects, aspects and the several advantages of this invention will be apparent to those skilled in the art from a study of this disclosure and the appended claims.

In accordance with the invention, sealant and coating compositions are provided by admixing a poly(oxyalkylene)-polyester-poly(monosulfide)-polythiol having an average of more than two mercapto groups per molecule, a bituminous material such as coal tar, and a filler. The resulting compositions can be cured with a curing agent to seal joints and cracks.

In accordance with a preferred embodiment of this invention, sealant and coating compositions exhibiting improved physical properties are provided by admixing a poly(oxyalkylene)-polyester-poly(monosulfide)-polythiol as defined together with a coal tar and a hard kaolin clay as filler, together with a minor amount of a pigment such as carbon black and a wetting agent such as lecithin. The resulting compositions can be cured, for example, with lead dioxide to seal joints and cracks such as between concrete slabs in pavements.

Although these sealant and coating formulations can be employed to join or coat various substrates such as wood, plastics, glass, stone such as granite, marble, or the like, concrete, or metal such as aluminum, steel, iron, zinc, or the like, the formulations are especially useful in sealing joints of concrete pavement on highways, bridges, airfields, and the like, where the strength, stiffness, and elasticity characteristic of the cured compositions are particularly important. Additionally, the cured compositions have good thermal and aging stability.

The poly(oxyalkylene)-polyester-poly(monosulfide)-polythiols having an average of more than two mercapto groups per molecule can be produced by reacting at least one mercaptoalkanoic acid and at least one thiodialkanoic acid with poly(oxyalkylene)-polyols having an average of more than two hydroxy groups per molecule.

The mercaptoalkanoic acids which can be used to prepare the poly(oxyalkylene)-polyester-poly(monosulfide)-polythiols can be represented by the formula $HS(CR_2)_nCOOH$, wherein each R is hydrogen or an alkyl radical having 1 to about 5 carbon atoms, with a total of not more than about 10 carbon atoms in all R groups per molecule; and wherein $n$ is an integer in the range of 1 to about 5. Examples of some mercaptoalkanoic acids which can be employed include mercaptoacetic acid, 3-mercaptopropionic acid, 2-mercaptopropionic acid, 4-mercaptobutyric acid, 3-isopropyl-5-mercaptovaleric acid, 2-ethyl-3-tert-butyl-5-mercaptovaleric acid, 2-propyl-3-mercaptoheptanoic acid, 3-pentyl-6-mercapto-undecanoic acid, and the like, and mixtures thereof.

The thiodialkanoic acids which can be employed in the production of the poly(oxyalkylene)-polyester-poly(monosulfide)-polythiols can be represented by the formula $HOOC(CR_2)_nS(CR_2)_nCOOH$, wherein R and $n$ are as defined above, with a total of not more than about 20 carbon atoms in all R groups per molecule. Examples of suitable thiodialkanoic acids which can be used include thiodiacetic acid, 3,3'-thiodipropionic acid, 2,2'-thiodipropionic acid, 2,3'-thiodipropionic acid, 4,4'-thiodibutyric acid, 5,5'-thiobis(3-isopropylvaleric acid), 5,5'-thiobis(2-ethyl-3-tert-butylvaleric acid), 3,3'-thiobis(2-propylheptanoic acid), 6,6'-thiobis(3-pentylundecanoic acid), 4-(carboxymethylthio)-valeric acid, and the like, and mixtures thereof.

A particularly preferred procedure for reacting the mercaptoalkanoic acids and thiodialkanoic acids with the poly(oxyalkylene)-polyols is to use a mixture of mercaptoalkanoic and thiodialkanoic acids. Generally, it is preferred to employ mixtures comprising 5 to 95 weight percent mercaptoalkanoic acid, more preferably 60 to 80 weight percent mercaptoalkanoic acid. Such mixtures of mercaptoalkanoic and thiodialkanoic acids can be prepared according to various procedures. For example, suitable mixtures can be prepared by mixing mercaptoalkanoic acids with thiodialkanoic acids. The presently preferred procedure for preparing such mixtures of mercaptoalkanoic and thiodialkanoic acids is by hydrolyzing a mixture of mercapto nitriles and thiodinitriles which can be produced from alkenenitriles and hydrogen sulfide according to processes known to the art such as that described in U.S. Pat. No. 3,280,163. For example, according to a presently preferred procedure, acrylonitrile can be reacted with hydrogen sulfide in the presence of sulfur and a weak organic base to form a mixture consisting largely of 3-mercaptopropionitrile and 3,3'-thiodipropionitrile, containing minor amounts of other nitriles, which mixture can be subsequently hydrolyzed, without the necessity of separation, to form a suitable mixture of largely 3-mercaptopropionic acid and 3,3'-thiodipropionic acid, together with minor amounts of other carboxylic acids. Representative examples of nitriles that can be used are set forth in U.S. Pat. No. 3,280,163.

The poly(oxyalkylene)-polyols used in the preparation of the poly(oxyalkylene)-polyester-poly(monosulfide)-polythiols employed in this invention have an average of more than 2, preferably at least 2.5, hydroxy groups per molecule and molecular weights of from about 200 to about 20,000. These substances can be produced by the reaction of one or more epoxy-substituted hydrocarbons having the general formula

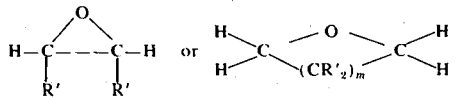

wherein each R' is hydrogen or an alkyl radical, the total number of carbon atoms per molecule being within the range of 2 to about 20, and m is an integer of from 1 to about 10, preferably 1 to 3, with a polyol having the formula $Y(OH)_x$, wherein Y is a hydrocarbon radical having at least 2, preferably 3 to about 30, carbon atoms, and a valence equal to the value of $x$, $x$ is an integer of at least 2 and preferably 3 to about 12, and the number of carbon atoms per molecule of $Y(OH)_x$ is equal to or greater than $x$. Preferably Y is a saturated aliphatic, saturated cycloaliphatic, or aromatic radical, or combination thereof, having at least 3 hydroxy groups per molecule. Examples of some polyols which can be used include ethylene glycol, glycerol, 1,3-propanediol, 2-butene-1,4-diol, erythritol, pentaerythritol, tris(hydroxymethyl)methane, 3-(hydroxymethyl)-1,5-pentanediol, 1,2,6-hexanetriol, 2-methyl-1,2,4,6,8,10-decanehexol, 1,2,3,6,7,9,12,14,15,17,19,-20-eicosanedodecol, 1,2,40-tetracontanetriol, 4-cyclohexene-1,2-diol, 1,4-cyclohexanediol, 1,5,9-cyclododecanetriol, 1,2,3,4-cyclopentanetetrol, 2-methyl-1,3,5-cyclooctanetriol, 4-(1,2-dihydroxyethyl)-cyclohexanol, resorcinol, phloroglucinol, 2,4,6-trihydroxytoluene, α,α-bis(p-hydroxyphenyl)benzyl alcohol, 1,4,5,8-naphthalenetetrol, and the like, and mixtures thereof. Examples of some epoxy-substituted hydrocarbons which can be used in the preparation of the poly(oxyalkylene)-polyols include 1,2-epoxyethane, 1,2-epoxypropane, 1,3-epoxypropane, 1,4-epoxybutane, 1,5-epoxypentane, 3-methyl-1,8-epoxyoctane, 4-octyl-1,12-epoxydodecane, 3-ethyl-5-isopropyl-1,10-epoxydecane, 2-butyl-1,6-epoxyhexane, 3-decyl-1,5-epoxypentane, 2-heptadecyl-1,3-epoxypropane, 1,2-epoxybutane, 2-methyl-3,4-epoxyheptane, 1,2-epoxyoctane, 2,3-epoxydodecane, 4-ethyl-1,2-epoxytetradecane, 1,2-epoxyeicosane, and the like, and mixtures thereof.

The poly(oxyalkylene)-polyols can be prepared by contacting at least one polyol of the formula $Y(OH)_x$, as defined above, with an epoxy-substituted hydrocarbon, as defined above, under suitable polymerization conditions, as is known to the art. For instance, glycerol or 1,2,6-hexanetriol can be contacted with an excess of propylene oxide (1,2-epoxypropane) under elevated pressure and in the presence of suitable polymerization promoters. Products of this type can be obtained from commercial sources. In the preparation of poly(oxyalkylene)-polyols having an average of more than 2 hydroxy groups per molecule, mixtures of the above polyols such as at least one diol and another polyol of higher functionality can be reacted with the epoxy-substituted hydrocarbons defined above to form poly(oxyalkylene)-polyols having an average of more than two hydroxy groups per molecule. For instance, a mixture of 1,4-butanediol and 1,2,6-hexanetriol can be reacted with ethylene oxide to produce a poly(oxyethylene)-polyol having an average of more than two hydroxy groups per molecule. Alternatively, a poly(oxyalkylene)-polyol produced, e.g., by the reaction of a diol such as ethylene glycol with an alkylene oxide such as propylene oxide can be mixed with another poly(oxyalkylene)-polyol produced, e.g., by the reaction of a triol such as 1,2,6-hexanetriol with an alkylene oxide such as propylene oxide.

The mixtures of mercaptoalkanoic acids and thiodialkanoic acids can be reacted with the poly(oxyalkylene)-polyols to form poly(oxyalkylene)-polyester-poly(monosulfide)-polythiols by an esterification reaction which can be effected in any suitable equipment at temperatures preferably in the range of about 50 to about 250°C. Preferably the reaction is conducted in the presence of diluents that are substantially completely inert to the reactants and products under the reaction conditions employed. Such diluents can comprise as much as 95 weight percent of the components charged to the reactor. Acid esterification catalysts such as p-toluenesulfonic acid, benzenesulfonic acid, sulfuric acid, and the like can also be employed, if desired, to accelerate the rate of reaction. In that event, the diluents employed also should be inert to the acid catalyst. Examples of suitable diluents include toluene, benzene, xylene, cyclohexane, heptane, and the like, and mixtures thereof. The reaction pressure should be sufficient to prevent excessive loss of reactants and/or solvent at operating temperatures. Satisfactory pressures are normally within the range of about 0.5 to about 10 atmospheres. It is normally desirable to provide a means of removing water of reaction during the course of the esterification. This function can be accomplished by means known to the art, e.g., by azeotropic distillation. Preferably, an inert gas such as nitrogen or helium is passed through the liquid mixture and out through the condensing system, thereby facilitating water removal during the esterification and, furthermore, serving to protect the poly(oxyalkylene)-polyol and mercaptan groups from oxidation and/or thermal degradation. The properties of the poly(oxyalkylene)-polyester-poly(monosulfide)-polythiols will vary somewhat depending upon the reactants employed, the ratios of the various reactants, and other reaction conditions. Normally these polymers will be viscous liquid short-chain polymers, the chain length depending to considerable extent on the ratio of thiodialkanoic acid to mercaptoalkanoic acid used. In general, higher ratios of thiodialkanoic acid to mercaptoalkanoic acid yield longer polymer chains and a more viscous liquid or near solid product.

The esterification reaction should be effected to such an extent that at least about 80 percent of the hydroxy groups of the poly(oxyalkylene)-polyol are reacted with carboxy groups of the mercaptoalkanoic acid or thiodialkanoic acid to form ester groups. In general, in the range of about 0.8 to about 1.2 equivalents of hydroxy groups of the poly(oxyalkylene)-polyol should be employed for each equivalent of carboxy groups of the mercaptoalkanoic acid and thiodialkanoic acid. In general, an average of more than 2, preferably at least 2.5, ester groups are formed for each molecule of poly(oxyalkylene)-polyol employed. Following the esterification reaction, the poly(oxyalkylene)-polyester-poly(monosulfide)-polythiol product can be neutralized, e.g., with ammonium hydroxide, calcium hydroxide, or the like, and diluent, if employed, is removed, prior to compounding of the polythiol product into the desired sealant or coating formulation.

Although any coal tar can be employed in the preparation of the sealant or coating formulations of this invention, generally the coal tar will have a viscosity at 25°C within the range of about 300 to about 30,000 centipoises, preferably about 500 to about 20,000 centipoises.

Fillers which can be employed in preparing the formulations of this invention include various types of clays, carbon black, slate flour, silica, limestone, calcium carbonate, asbestine, titanium dioxide, iron oxide, alumina, zirconia, and the like. The filler presently preferred is a so-called hard clay, e.g., a hard kaolin clay such as Dixie clay.

If desired, minor amounts of one or more modifiers such as pigments, plasticizers, extenders, stabilizers, thickeners, adhesion promoters, or wetting agents can be present in the formulations of this invention.

The amount of poly(oxyalkylene)-polyester-poly(-monosulfide)-polythiol in the sealant or coating formulations can vary over a considerable range depending in part on the characteristics desired of the sealant or coating, but the poly(oxyalkylene)-polyester-poly(-monosulfide)-polythiol generally will constitute about 10 to about 65, preferably about 15 to about 35, weight percent of the sealant or coating formulation, excluding curing agent. Similarly excluding the curing agent, the coal tar should constitute about 25 to about 60, preferably about 30 to about 50, weight percent of the sealant or coating formulation, and the filler should constitute about 10 to about 60, preferably about 30 to about 50, weight percent of the sealant or coating formulation.

The poly(oxyalkylene)-polyester-poly(monosulfide)-polythiols in the sealant or coating formulations of this invention can be cured with conventional curing agents including free oxygen-containing fluids such as, for example, air; peroxy compounds such as, for example, di-tert-butyl peroxide and cumene hydroperoxide; metal oxides such as, for example, the oxides of lead, zinc, manganese, calcium, barium, copper, mercury, tin, and iron; metal salts of carboxylic acids such as, for example, lead stearate, zinc laurate, and zinc acetate; ammonium and alkali metal chromates and persulfates; sulfur; and the like. The curing time will vary with the polymer, the curing agent, the sealant or coating formulation, and the temperature. In general, sufficient curing agent is employed to convert at least about 70 percent of the mercapto groups in the polymer to polysulfide linkages.

In the mixing of ingredients, it is important that the poly(oxyalkylene)-polyester-poly(monosulfide)-polythiol and the curing agent be kept separate until about the time of application of the composition. Otherwise, the mode of mixing is not critical. In preferred procedures, the poly(oxyalkylene)-polyester-poly(monosulfide)-polythiol, the coal tar, and the filler are mixed first, with the curing agent subsequently being blended with the resulting pre-mix, or the curing agent is mixed with at least a portion of the coal tar and/or filler, and the resulting mixture is blended with the poly(oxyalkylene)-polyester-poly(monosulfide)-polythiol, which can contain coal tar and/or filler. Any modifiers employed can be added at such time as is found to be practical. The blending of ingredients can be achieved by conventional methods such as hand-mixing or machine-blending.

EXAMPLE I

The sulfur-2-methyl-5-ethylpyridine-catalyzed reaction of hydrogen sulfide with acrylonitrile was conducted by the process of U.S. Pat. No. 3,280,163 to provide a nitrile mixture having the following composition:

| Component | Weight Percent |
| --- | --- |
| Lights | 0.9 |
| 3-Mercaptopropionitrile | 71.9 |
| 2,3'-Thiodipropionitrile | 1.7 |
| 3,3'-Thiodipropionitrile | 20.5 |
| 3,3'-Dithiodipropionitrile | 3.6 |
| Unknown | 1.4 |

A portion of the above product was hydrolyzed to the corresponding acids. To 100 pounds of the mixture of nitriles at 150°F (66°C) in a 100-gallon glass-lined stirred reactor was added slowly within a period of 1 hour 181 pounds of concentrated hydrochloric acid, resulting in a slight exotherm. The reaction temperature was then maintained at 190°–210°F (88°–99°C) for 3 hours after the acid addition was complete. Water and excess hydrochloric acid were removed at 210°F (99°C) at a pressure of not less than 50 mm Hg. After addition of 598 pounds of xylene, the residual mixture was heated to 212°F (100°C). Both heating and stirring were then stopped, at which time ammonium chloride by-product settled. Analysis of a sample of the hot supernatant xylene solution indicated it contained 10.22 weight percent 3-mercaptopropionic acid and 5.63 weight percent dicarboxylic acids, calculated as thiodipropionic acid and comprising largely 3,3'-thiodipropionic acid with minor amounts of 2,3'-thiodipropionic acid and 3,3'-dithiodipropionic acid. The hot slurry was then filtered through a pre-coated Sparkler filter, and the filtrate was passed into a 1000-gallon glass-lined stirred reactor. The residue was washed with about 650 pounds of xylene, and the washings were combined with the filtrate in the 1000-gallon reactor. The resulting xylene solution contained about 113 pounds of the mixture of carboxylic acids.

The xylene solution of carboxylic acids was esterified with Niax LHT-34 poly(oxyalkylene)-polyol (derived from 1,2,6-hexanetriol and propylene oxide, and having an equivalent weight of about 1660 and a hydroxyl number of about 33.7). To the 1000-gallon reactor containing the above 113 pounds of the mixture of carboxylic acids and about 1100 pounds of xylene was added 1794 pounds of Niax LHT-34 poly(oxyalkylene)-polyol, 18 pounds of p-toluenesulfonic acid monohydrate, and about 2400 pounds of xylene. The ratio of hydroxy groups in the poly(oxyalkylene)-polyol to carboxy groups in the mixture of acids was about 0.95:1. As the reaction mixture was stirred and heated, a slow stream of nitrogen was passed from the bottom of the reactor through the liquid mixture and out through the condensing system. This nitrogen stream facilitated water removal during the esterification reaction and served to protect the poly(oxyalkylene)-polyol and mercaptan groups from oxidation and/or thermal degradation. An induction tube was used to periodically sample the reaction mixture to determine the extent of esterification by means of carboxylic acid and mercaptan analyses. A modified Dean-Stark sight-glass was provided to remove water, azeotroped with xylene, as it formed. Water began to azeotrope at 215°F (102°C). The pot temperature was gradually increased to a maximum of 280°F (138°C) at the end of 48 hours. After the esterification was complete, as determined by the leveling off of the carboxylic acid content, the reaction mixture was cooled to about 70°E (21°C). To the mixture was then added as a neutralizing agent 100 pounds of calcium hydroxide slurried in 100 gallons of xylene. The mixture was stirred 4 hours and filtered through a pre-coated Sparkler filter. The filtrate was heated to a maximum of 200°F (93°C)/20 mm Hg with nitrogen bubbling through the liquid phase to enhance removal of xylene. Approximately 1600 pounds of poly(oxyalkylene)-polyester-poly(monosulfide)polythiol having an average of more than two mercapto groups per molecule was obtained as a residual product having a mercaptan sulfur content of 0.90 weight percent, an acid number (mg KOH/g sample) of 0.11, and a viscosity of 7000 cps at 25°C.

3 days. The cured sealant slabs were removed from the frames, and modulus, tensile break and elongation were determined by the method of ASTM D 638-56T on samples 2½ inches × ⅛ inch × ⅛ inch cut from the slabs. Other portions of the mixtures containing the curing agent were poured into concrete-to-concrete test assemblies in which curing was allowed to take place at about 25°C for 2 days and then at 70°C for three days, after which modulus was determined by the method described for two-component polysulfide-base sealing compounds, USASI, A 116.1. The percent recovery after 24 hours at 100 percent elongation, conducted on the compositions cured at about 25°C for 2 days and then at 70°C for 3 days, was determined by the method of USASI, A 116.1, except that the samples were held at 100 percent elongation for 24 hours instead of at 150 percent elongation for 5 minutes. The formulations and test results are summarized in Table I.

TABLE I

| Formulation | 1 | 2 | 3 | 4 | 5 | 6 |
|---|---|---|---|---|---|---|
| Polymer A, g | 11.33 | 11.33 | 11.33 | — | — | — |
| LP-32, g | — | — | — | 11.33 | 11.33 | 11.33 |
| X-743$^a$, g | 23.46 | — | — | 23.46 | — | — |
| L-55$^b$, g | — | 23.46 | — | — | 23.46 | — |
| Crude Tar$^c$, g | — | — | 23.46 | — | — | 23.46 |
| Dixie Clay, g | 23.25 | 23.25 | 23.25 | 23.25 | 23.25 | 23.25 |
| Lecithin, g | 0.74 | 0.74 | 0.74 | 0.74 | 0.74 | 0.74 |
| Lead Dioxide, g | 1.20 | 1.20 | 1.20 | 1.20 | 1.20 | 1.20 |
| Viscosity$^d$, cps | 75,000 | 14,400 | 640,000 | >8,000,000 | 112,000 | >8,000,000 |
| Tack-Free Time$^e$, hr. | >48 | >48 | >48 | >48 | 16 | 16 |
| 50% Modulus$^f$, psi | 28.8 | 19.4 | 25.0 | 5.8 | Too soft to test | 3.1 |
| 100% Modulus$^f$, psi | 38.1 | 29.0 | 33.4 | 4.2 | | — |
| Tensile Break$^f$, psi | 52.8 | 56.7 | 40.0 | 4.9 | | 5.2 |
| Elongation$^f$, % | 255 | 205 | 200 | 105 | | 37.5 |
| 50% Modulus$^g$, psi | 11.0 | 2.4 | 6.3 | 2.3 | 4.0 | Too soft to test |
| 100% Modulus$^g$, psi | 15.4 | 3.4 | 10.5 | 2.5 | 4.2 | |
| Recovery$^h$, % | 85 | 87 | 50 | 35 | 48 | |

$^a$X-743 plasticizer, a coal tar having a viscosity of 15,200 centipoises at about 25°C from Neville Chemical Company.
$^b$Nebony L-55 coal tar having a viscosity of approximately 650 centipoises at about 25°C from Neville Chemical Company.
$^c$Coal tar having a viscosity of 2725 centipoises at about 25°C from Reilly Tar and Chemical Corporation.
$^d$Viscosity 5 minutes after mixing lead dioxide with other ingredients.
$^e$Federal Specification TT-S-227b.
$^f$ASTM D 638-56T.
$^g$USASI, A 116.1.
$^h$Percent recovery after 24 hours at 100 percent elongation, determined as described preceding this table.

EXAMPLE II

Three formulations were prepared by intimately mixing the poly(oxyalkylene)-polyester-poly(monosulfide)-polythiol product obtained in Example I, herein designated as Polymer A, a coal tar, Dixie clay (hard kaolin clay), and lecithin (a wetting agent). Three control formulations outside the scope of the invention were prepared similarly except that Thiokol LP-32 polysulfide liquid polymer, herein designated as LP-32, was used instead of Polymer A. The LP-32 had an average structure which can be represented as HS($C_2H_4OCH_2OC_2H_4SS$)$_{23}C_2H_4OCH_2OC_2H_4SH$, a viscosity at 80°F within the range of 35,000–45,000 centipoises, and an average molecular weight of about 4000. The three coal tars employed differed greatly in viscosity. With each of the six formulations was then mixed lead dioxide as a curing agent, and the viscosity of each mixture was determined 5 minutes later (on different samples prepared in like manner). Approximate tack-free time was determined by the method of Federal Specification TT-S-227b. Portions of the mixtures containing the curing agent were cast into picture frame molds 2½ inches × 2½ inches × ⅛ inch, and the compositions were allowed to cure at ambient room temperature (about 25°C) for 2 days and then at 70°C for As shown in the above table, the compositions prepared through use of the poly(oxyalkylene)-polyester-poly(monosulfide)-polythiol were (a) much stronger, based on tensile break values, (b) stiffer in most instances, based on modulus values, and (c) more elastic, based on elongation values and values for recovery after 100 percent elongation, than were the corresponding compositions produced through use of the Thiokol Lp-32 polysulfide liquid polymer.

EXAMPLE III

A formulation was prepared by mixing 8 g poly(oxyalkylene)-polyester-poly(monosulfide)-polythiol [prepared essentially as described in Example I and having a mercaptan sulfur content of 0.97 weight percent, an acid number (mg KOH/g sample) of 0.33, and a viscosity of 6000 cps at 25°C], 14 g X-743 plasticizer (a coal tar described in Example II), 18 g Dixie clay (hard kaolin clay), 0.04 g carbon black (N765 from Phillips Petroleum Company), and 0.4 g lecithin. The resulting blend was then mixed with 0.5 g of a mixture of 45 weight percent lead dioxide, 50 weight percent dibutyl phthalate, and 5 weight percent stearic acid. A portion of the resulting mixture (Mixture A) was cast into a picture frame mold 2½ inches × 2½ inches × ⅛ inch, and the composition was allowed to cure for 1 day at about 25°C, then 3 days at 70°C, and then 1 day at about 25°C. The cured sealant slab was removed from the frame, and the modulus, tensile break, and elongation were determined by the method of ASTM D 638-56T on a sample 2½ inches × ⅛ inch × ⅛ inch cut from the slab. A like sealant slab, prepared and cured in comparable manner, was subjected to accelerated aging for 378 hours in an Atlas Weather-O-Meter (Model 600-WR12, xenon lamp ultraviolet light radiation, 145°F, 50 percent relative humidity, 15 pphm ozone), after which modulus, tensile break, and elongation were determined by the method of ASTM D 638-56T on a sample 2½ inches × ⅛ inch × ⅛ inch cut from the resulting slab. Another portion of Mixture A, described above, was poured into a concrete-to-concrete test assembly in which curing was allowed to take place for 1 day at about 25°C, then 3 days at 70°C, and then 1 day at about 25°C, after which 50 percent modulus, 100 percent modulus and percent recovery after 24 hours at 100 percent elongation were determined as described for the concrete-to-concrete tests in Example II. The results of the tests are summarized in Table II.

TABLE II

| Specimens from Sealant Slabs | | |
|---|---|---|
| | Without Weather-O-Meter Exposure | After Weather-O-Meter Exposure |
| 50% Modulus, psi | 32.7 | 18.7 |
| 100% Modulus, psi | 45.0 | 24.3 |
| Tensile Break, psi | 49.9 | 25 |
| Elongation, % | 153 | 110 |
| Concrete-to-Concrete Sealant Specimen | | |
| 50% Modulus, psi | 11 | |
| 100% Modulus, psi | 15 | |
| Recovery, % | 63 | |

As shown in Table II, the cured sealant exhibited good strength, stiffness, and elasticity and retained these characteristics to a large degree after being subjected to accelerated aging conditions.

We claim:

1. Compositions capable of being cured to sealant and coating compositions having improved tensile break values, modulus values and elongation values comprising:
    a. about 10 to about 65 weight percent of at least one poly(oxyalkylene)-polyester-poly(monosulfide)-polythiol having an average of more than two mercapto groups per molecule,
    b. about 25 to about 60 weight percent coal tar,
    c. about 10 to about 60 weight percent of at least one filler selected from clays, carbon black, slate flour, silica, limestone, calcium carbonate, asbestine, titanium dioxide, iron oxide, alumina, and zirconia, and
    d. at least one curing agent in an amount sufficient to convert at least about 70 percent of the mercapto groups in the polymer to polysulfide linkages.

2. A composition according to claim 1 which additionally contains non-elastomeric components selected from pigments, plasticizers, extenders, stabilizers, thickeners, adhesion promoters, and wetting agents.

3. A composition according to claim 1 wherein (a) is the reaction product of
    1. a mercaptoalkanoic acid having the formula HS(CR$_2$)$_n$COOH wherein R is selected from the group consisting of hydrogen and alkyl radicals having from 1–5, inclusive, carbon atoms, the maximum number of carbon atoms in all R groups being 10, and n is an integer ranging from 1–5,
    2. a thiodialkanoic acid having the formula HOOC(CR$_2$)$_n$S(CR$_2$)$_n$COOH wherein R and n are as defined above, the maximum number of carbon atoms in all R groups being 20, and
    3. a poly(oxyalkylene)-polyol having on average more than two pendent hydroxy groups per molecule and a molecular weight in the range 200–20,000, the amount of (3) being in the range 0.8–1.2 equivalents of pendent hydroxy groups for each equivalent of carboxylic groups of the mercaptoalkanoic and thiodialkanoic acids.

4. A composition according to claim 1 wherein
    b. is a coal tar having a viscosity at 25°C within the range of about 300 to about 30,000 centipoises,
    c. the filler is a hard kaolin clay, and
    d. the curing agent is lead dioxide.

5. A composition according to claim 1 wherein
    a. is present in said composition in amounts ranging from about 15 to about 35 weight percent,
    b. a coal tar is present in amounts ranging from about 30 to about 50 weight percent, and has a viscosity at 25°C within the range of about 500 to about 20,000 centipoises, and
    c. a filler is present in amounts ranging from about 30 to about 50 weight percent.

6. A composition according to claim 3 which contains
    d. a curing agent selected from peroxy compounds, metal oxides, metal salts of carboxylic acids, ammonium and alkali metal chromates and persulfates, and sulfur, in an amount sufficient to convert at least about 70 percent of the pendent thiol groups to polysulfide groups.

7. A composition according to claim 3 wherein
    a. is present in amounts ranging from about 15 to about 35 weight percent,
    b. the coal tar is present in amounts ranging from about 30 to about 50 weight percent and has a viscosity at 25°C within the range of about 500 to about 20,000 centipoises, and
    c. the amount of filler present ranges from about 30 to about 50 weight percent.

8. A composition according to claim 3 wherein (c) is hard kaolin clay and the composition contains
    d. lead dioxide as a curing agent.

9. A composition according to claim 3 wherein (a) is formed by reacting
    1. 3-mercaptopropionic acid,
    2. thiodipropionic acid, and
    3. a poly(oxyalkylene)-polyol formed by reacting 1,2,6-hexanetriol and propylene oxide, and further wherein the amount of (1) employed ranges from 60 to 80 weight percent based upon the total of (1) and (2).

10. A composition according to claim 9 wherein said filler (c) is hard kaolin clay and the composition additionally contains
   d. lead dioxide as a curing agent,
together with a minor amount of carbon black as pigment and lecithin as wetting agent.

11. A process for the production of sealant and coating compositions which comprises mixing
   a. about 10 to about 65 weight percent of at least one poly(oxyalkylene)-polyester-poly(monosulfide)-polythiol having an average of more than two mercapto groups per molecule,
   b. about 25 to about 60 weight percent coal tar,
   c. about 10 to about 60 weight percent of at least one filler selected from clays, carbon black, slate flour, silica, limestone, calcium carbonate, asbestine, titanium dioxide, iron oxide, alumina, and zirconia, the amount of each of (a), (b), and (c) being based upon the total amount of (a) plus (b) plus (c), and
   d. a curing agent selected from peroxy compounds, metal oxides, metal salts of carboxylic acids, ammonium and alkali metal chromates and persulfates, and sulfur in an amount sufficient to convert at least about 70 percent of the pendent thiol groups to polysulfide groups, and
   e. allowing the thus prepared formulation to cure to form sealants and coatings having a desirable balance of properties.

12. A process according to claim 11 wherein said polythiol is formed by reacting 3-mercaptopropionic acid, thiodipropionic acid and a poly(oxyalkylene)-polyol formed by reacting 1,2,6-hexanetriol and propylene oxide.

13. A process according to claim 11 wherein (c) is hard kaolin clay and (d) is lead dioxide.

14. A process according to claim 11 wherein the curing agent is added to a mixture of (a), (b), and (c).

15. A process according to claim 4 wherein at least a portion of the curing agent is mixed with at least a portion of at least one of (b) and (c) prior to mixing with (a).

* * * * *